United States Patent [19]

Taubitz et al.

[11] Patent Number: 4,926,983
[45] Date of Patent: May 22, 1990

[54] HYDRAULIC SHOCK ABSORBER

[75] Inventors: Bernd Taubitz, Schwieberdingen; Peter Zieher, Eberdingen; Claus Kramer; Kurt Engelsdorf, both of Besigheim; Armin Schuelke, Ludwigsburg, all of Fed. Rep. of Germany

[73] Assignee: Robert Bosch GmbH, Stuttgart, Fed. Rep. of Germany

[21] Appl. No.: 300,872

[22] Filed: Jan. 24, 1989

[30] Foreign Application Priority Data

Feb. 25, 1988 [DE] Fed. Rep. of Germany ....... 3805934

[51] Int. Cl.[5] .............................. F16F 9/46; F16K 31/02
[52] U.S. Cl. .................................. 188/299; 137/625.3; 188/319; 251/129.11
[58] Field of Search ........... 188/299, 319, 279, 322.22; 251/129.11, 129.12; 137/625.37, 625.38, 625.3, 625.32

[56] References Cited

U.S. PATENT DOCUMENTS

| | | | |
|---|---|---|---|
| 4,527,676 | 7/1985 | Emura et al. | 188/319 X |
| 4,645,042 | 2/1987 | Inoue et al. | 251/129.12 X |
| 4,660,686 | 4/1987 | Munning et al. | 188/319 X |
| 4,671,392 | 6/1987 | Wossner | 188/319 X |
| 4,681,143 | 7/1987 | Sato et al. | 188/319 X |
| 4,754,855 | 7/1988 | Kuwana et al. | 188/319 X |

FOREIGN PATENT DOCUMENTS 3635894 5/1988 Fed. Rep. of Germany .................... 188/322.22

Primary Examiner—Robert J. Oberleitner
Attorney, Agent, or Firm—Edwin E. Greigg

[57] ABSTRACT

A hydraulic shock absorber with automatically adjustable damper force which actuates an electromagnetic rotary adjuster for a control slide that monitors a sole flow cross section. The rotary adjuster is embodied as a permanently excited single-winding rotary adjuster, and because of its permanent magnetic poles in the rotor, even when it is currentless it furnishes a torque that assures safety resetting of the rotary adjuster if the current fails. The hydraulic shock absorber is intended for controlling the undercarriage of a motor vehicle.

23 Claims, 3 Drawing Sheets

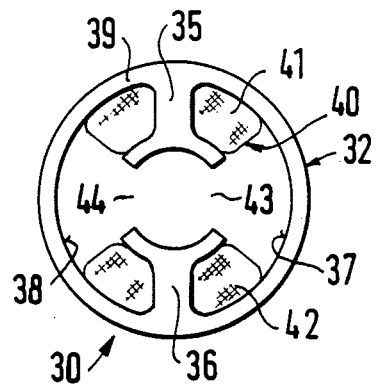
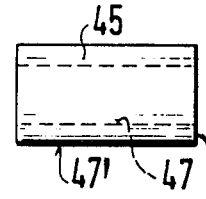
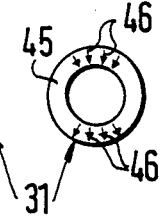
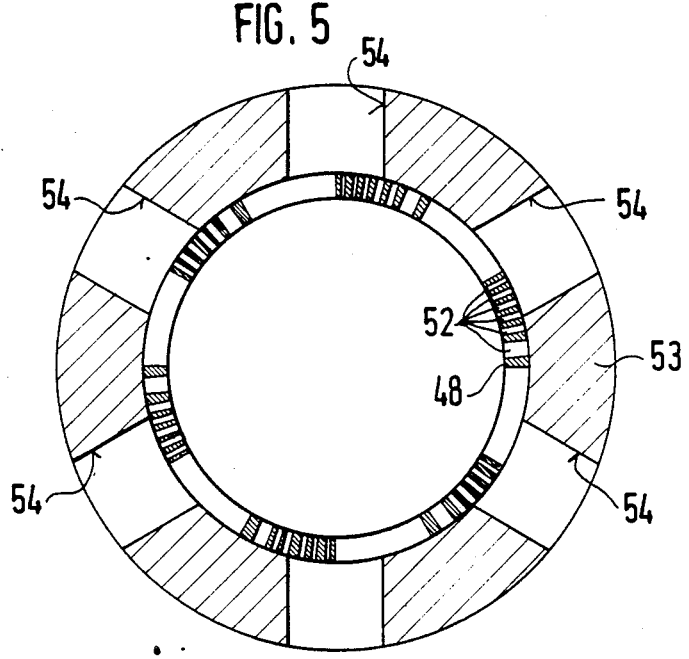

HYDRAULIC SHOCK ABSORBER

BACKGROUND OF THE INVENTION

The invention relates to a hydraulic shock absorber as defined herein. A shock absorber of this type is known (German Patent No. 33 12 899).

This known hydraulic shock absorber has a stepping motor, with which a rotary slide is rotated in increments until the rotary slide faces corresponding openings in the piston rod. The stepping motor operates by the reluctance principle. A magnetically conductive sheath has soft magnetic cams that are attracted by electromagnets located in the stator and are thereby rotated into a predetermined position. The drive is based on the different magnetic conductances brought about by the cams. It is therefore impossible to use a smooth-surfaced rotor.

The motion of the cams in a fluid generates considerable fluid friction, resulting in major damping of the system. Because the viscosity of the damper fluid is dependent on temperature, the damping is variable as a function of temperature and must be taken into account when the system is regulated.

Without considerable additional expense for electronics (half-step method), there is a relatively high lower limit to the step size of the stepping motor. Fine gradations are therefore impossible. The step size of a given stepping motor is invariable and hence cannot be adapted during operation to prevailing requirements.

The stator winding of the drive comprises a plurality of coils, through which current flows in alternation. The torque is therefore always produced by only a single coil at a time, which means that a large proportion of the available winding space at a given moment goes unused.

To effect a reset for safety reasons in the case of defective triggering, a restoring spring is provided, but its use also has disadvantages.

Since the known shock absorber has a piston with mechanical compression springs for a basic damping valve, only a bypass throttle cross section is changed by the aforementioned rotary slide valve.

By disposing the throttle cross section in the hollow piston rod, finally, the total cross section is limited by the rod diameter and cannot be optimally adapted to a required total flow.

OBJECT AND SUMMARY OF THE INVENTION

The hydraulic shock absorber of the type described above, improved by the characteristics set forth herein has an advantage over the prior art that it has a continuous-adjustment system, which can effect a graduated or continuous adjustment depending on how it is triggered. The entire throttle cross section of the damping piston is adjusted; thus no stepping motor is used, and if a graduated adjustment is intended, the number of stages is limited only by the resolution of the position sensor. The step size is accordingly variable and can be used to linearize the characteristic force/travel curve of the damper. Continuous adjustment can be optimized by using particular control cross sections. Since the adjustment system is equipped with permanent magnetic poles in the rotor, it still furnishes torque when it is currentless, and this torque is advantageously utilized to effect a safety reset, thus obviating a restoring spring.

Another advantage is that the rotating parts are provided with a smooth surface. This reduces the fluid friction and the damping of the adjustment system. Therefore, the viscosity of the damper fluid and its temperature dependency do not need to be taken into account in triggering the adjuster.

There is also the further advantage that the winding of the proposed drive comprises a single coil. This makes production of the winding simpler, and the available winding space is optimally exploited to generate torque.

Another advantage is that only the entire throttle cross section is adjusted. Because the rotary slide is disposed in, rather than above the piston rod, the throttle cross section is easily adaptable to the required total flow by selecting the rotary slide diameter.

Finally, the shock absorber according to the invention has the advantage of high torque, a low moment of inertia, lesser damping of the damper adjustment, a small rotational angle, and reduced friction.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 is a sectional view of a stator of the rotary adjuster;

FIGS. 3a and 3b show the rotor of the rotary adjuster in front and side view;

FIG. 5 is a section through the rotary control slide and fixed control slide.

DESCRIPTION OF THE PREFERRED EMBODIMENT

Figure 1:
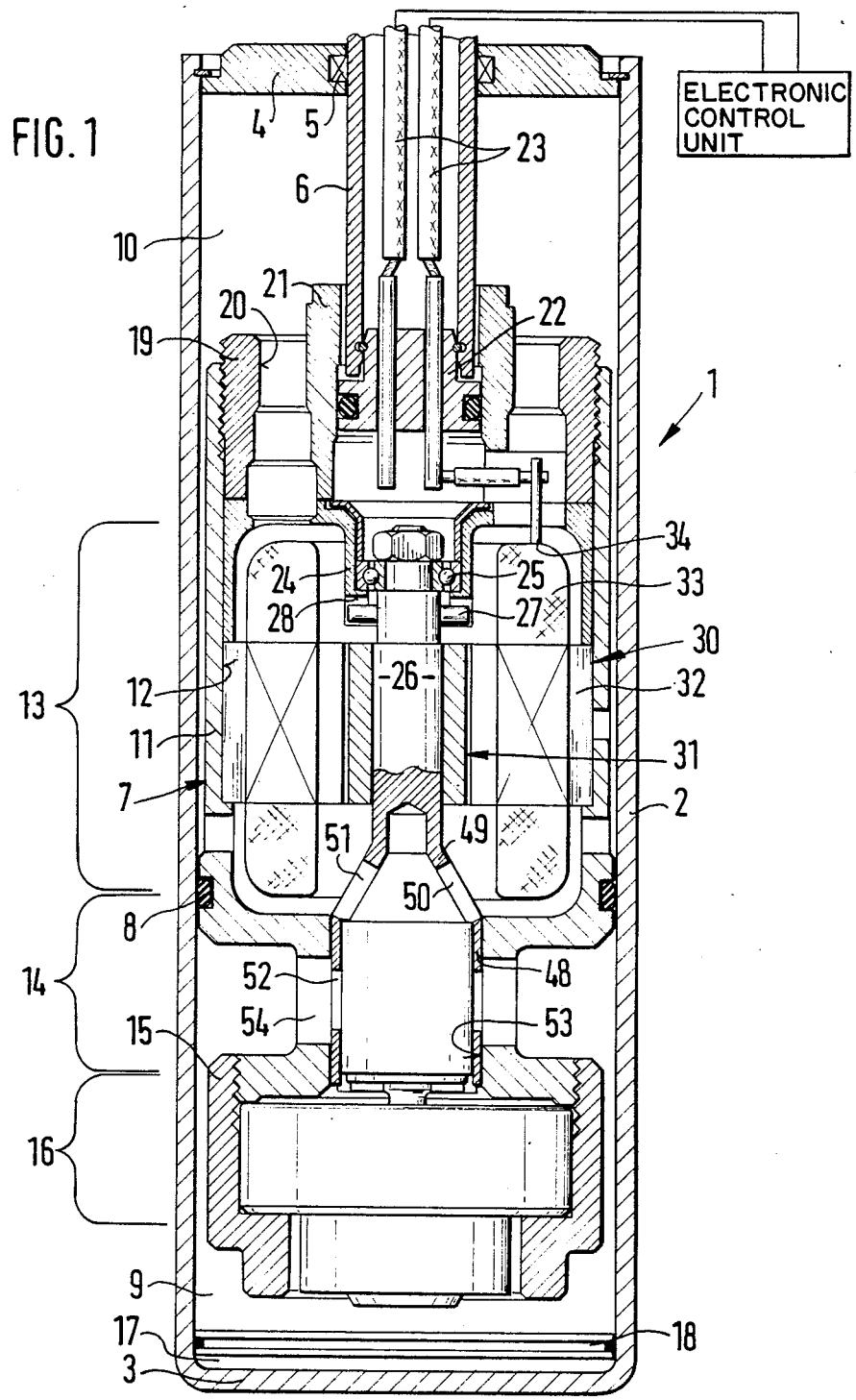
FIG. 1 is a sectional view of the shock absorber.

A hydraulic shock absorber 1 has a cylindrical jacket tube 2, provided at the bottom with a base 3 with which it is secured to a vehicle axle, not shown. The upper end of the jacket tube 2 is closed with a cap 4, which has a pressure-tight duct 5 for a piston rod 6, the upper end of which is connected to a vehicle body, not shown. On its lower end, the piston rod 6 is connected to a damper piston 7, which is slidably movable in the jacket tube 2. A seal 8 in the damper piston 7 on the interior of the shock absorber divides two work chambers 9 and 10 from one another. The piston rod 6 and the damper piston 7 are hollow; the damper piston 7 has a housing 11 with a recess 12 for receiving an electromagnetic rotary adjuster 13 and a hydraulic control slide 14. A position sensor 16 is provided in an extension 15 of the piston housing 11.

Finally, a gas-filled compensation chamber 17 also adjoins the work chamber 9, being divided from the chamber 9 by a piston 18 and serving to equalize the volume when the piston rod 6 is extended and retracted.

A housing flange 19 is screwed into the piston housing 11 from the top and has a plurality of axial openings 20, distributed uniformly around its axis for the fluid to flow through. An upper tubular extension 21 of the flange 19 receives the inner end of the piston rod 6 and is provided with a sealing plug 22 which seals an electrical lead duct for electrical conductors 23 which are connected with an electronic control unit. A lower tubular extension 24 of the flange 19 includes a ball bearing 25 for a rotary adjuster shaft 26, into which a crosspin 27 is diametrically pressed, directly below the ball bearing 25. The ends of the crosspin protruding from the shaft 26 are received by a groove 28 of the tubular extension 24. The groove 28 extends azimuthally over an angle that is larger than the adjusting range of the rotary adjuster 13 (see also FIG. 5). The rotary adjuster 13 inserted into the piston housing recess 12 comprises a stator 30 and a permanent magnetic rotor 31. The stator has a stator lamination packet 32 and a winding 33 with a winding lead 34. The individual stator parts are shown again in FIG. 2, which is a cross section through the stator lamination packet 32. The packet has two oppositely disposed teeth 35 and 36, two grooves 37 and 38 and a magnetic short circuit 39. A coil 40, which is divided into two halves 41 and 42, is inserted into the grooves 37 and 38. The two coil halves 41 and 42 are connected in series and each is wound about a respective tooth 35 and 36. The coil winding 33 is laid into the grooves through the openings 43 and 44 in the grooves 37 and 38.

FIGS. 3a and 3b show the rotor 31 of the rotary adjuster 13. It is embodied as a hollow cylinder 45, which is made of a hard magnetic material such as Seemorium-Cobalt SmCo and is magnetized diametrically, as the arrows 46 indicate. Its inner and outer jacket faces 47 and 47' are polished smooth. Its outer circumference is approximately equal to the outer circumference of the piston rod 6.

As FIG. 1 shows, the control slide 14, which is actuatable by the rotary adjuster 13, has a rotary slide 48, which is embodied by enlarging the lower part of the shaft 26. At the site of the enlargement 49, two openings 50, 51 for fluid flow are provided. The rotary slide 48 has radial openings 52 as control openings and is inserted into a housing recess of the damper piston 7, which as a fixed hollow-cylindrical slide 53 is likewise provided with radial openings 54 as control openings. The rotary slide 48 and slide 53 are shown again in section in FIG. 5, which shows that the slide has six uniformly distributed radial openings 54 as control openings over 360°, and that the radial openings 52 of the rotary slide 48 are slits of various widths, which extend over an angle of less than 30°, serving as an adjusting range, and like the openings 54 are equally spaced and are repeated six times over 360°. Upon each deflection by 30° to the left or right, the rotational motion of the rotor 31 is limited by a stop 27/28 formed by the end of the groove 28 for the crosspin 27.

The seven possible adjusting steps are each embodied such that in each adjusting range, the slide 48 is rotated such that a predetermined number of slits 52 is rotated to a position in front of the openings 54. The hydraulic throttle cross section at any given time is the sum of all the slits 52 of the six control ranges that arrive in a position in front of all of the openings 54 and a gap between the rotary slide 48 and fixed slide 53 formed upon assembly.

Figure 4:
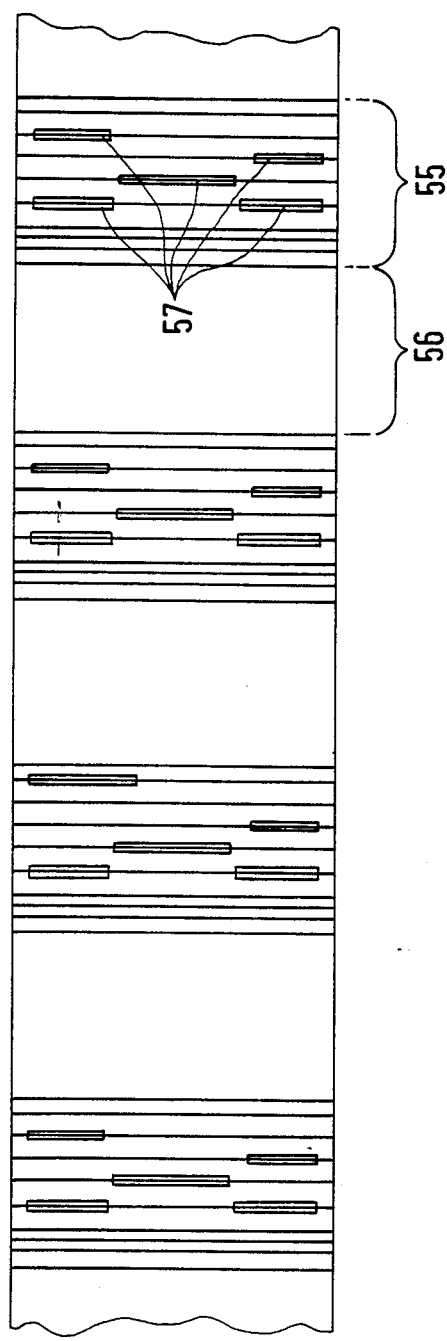
FIG. 4 is a developed view of the cylinder jacket face of the rotary slide.

In FIG. 4, a developed view of the rotary slide 48 is shown. It can be seen that the rotary slide has seven stages, which are embodied by the openings 52 of the rotary slide 48. Of these, the first stage is a closed stage, which by leakage determines the basic flow through the shock absorber. Of the other six stages, only four are shown in FIG. 4.

Mode of Operation

When the shock absorber is not triggered, only the permanent magnetic forces are operative in the rotary adjuster 13 which keeps the control slide 14 in its first stage, which determines the basic flow. The control slide also assumes this position in the event the signalling and power electronics fail.

The permanently excited rotary adjuster 13 adjusts the hydraulic throttle cross section in the control slide 14 in accordance with vehicle and road conditions; the damper fluid flow from one work chamber to the other in the shock absorber flows only through this throttle cross section.

For adjusting the shock absorber, the winding 33 of the electromagnetic rotary adjuster 13 is supplied by an alternating current bridge circuit (H circuit); that is, two current directions are made available and when given a bipolar supply, the permanent-magnetic rotor 31 of the electromagnetic rotary adjuster has two torque directions. The torque of the rotary adjuster is the result of the cooperation of the coil field and of the permanently excited rotor field. The direction of the adjusting moment is determined by the current direction at the time. The absolute maximum torque is attained in the position in which the stator field and rotor field form an angle of 90° with one another, if the armature recoil is ignored. In this position, the center of the permanent magnetic rotor poles at the air gap is opposite the groove openings 43 and 44 (FIG. 2). Beginning at this position, the course of the torque is approximately trapezoidal over an angular range of +90° for a fixed current intensity. To attain the greatest possible adjusting moment for the active adjusting range, the maximum adjusting range is located symmetrically with respect to the above-mentioned position and is limited to 30°. By a corresponding positional regulation on top of current regulation, any desired angle within the active adjustment range can be set.

Besides the adjusting moment at a given time, brought about by the cooperation of the stator and rotor fields, the electromagnetic rotary adjuster 13 has a further torque as well, which results from the force of attraction between the magnet poles and the stator teeth 35 and 36. This locking moment, which is superimposed on the adjusting moment, also occurs when the coil is currentless. It turns the rotor 31 toward either the first or the second stator tooth, depending on the rotor position at the time. The motion in the currentless state is limited by the stop 27/28.

As the developed view of the cylindrical jacket face of the rotary slide 48 shows, the jacket face is divided into control zones 55 and closing zones 56. While the closing zones 56 comprise solid material, the control zones 55, in this version, are represented by control slides 57 of various lengths and widths. By rotating the control zones partly or completely to in front of rectangular openings 54 located in the slide 53, the hydraulic cross section is varied, which takes place in seven stages. The actual control edge, embodied by one side of the opening 54, is positioned at a web in the middle between two control slides 57. The basic damping, with complete coincidence of the opening 54 and the closing zone 56, is assured by the basic flow. In this version, the characteristic damper curve of the damper force over the angle can be adapted by suitably dimensioning the control faces. Other possible versions provide the option of continuous adjustment of the throttle cross section, for instance having rectangular, triangular or other shapes of openings in the control zones, with which the characteristic curve of damper force over angle can easily be adapted.

The hydraulic shock absorber according to the invention has the following advantages:

1. Active (that is, electromagnetically actuated) opening and closing of the throttle cross section. This provides for identical adjustment times in both rotational directions.

2. Low dependency of the adjusting times on temperature. Because of the smooth structure of the hollow cylinder 45 of the rotary adjuster 13, the fluid friction is low. The rotary motion avoids positive displacement of the damper fluid, such as occurs in a longitudinal adjuster. The result is low damping of the rotary adjuster. The effect of temperature-dependent viscosity on the damping of the adjusting motion is accordingly negligible. The adjusting times are virtually independent of the damping fluid temperature.

3. Simplified position regulation by means of a linear characteristic current/torque curve of the rotary adjuster 13. The characteristic current/torque curve is virtually linear by principle. In contrast to a longitudinal adjusting system, the large air gap does not cause any magnetic hysteresis.

4. Simple adaptation of the characteristic damper force over angle curve by suitable shaping of the control zones of the rotary slide 48.

5. A graduated adjustment of the damper force is possible.

6. Simple modular attachment of the position sensor to the adjusting system (no need to integrate the sensor with the adjuster).

7. The relatively large adjusting angle of the rotary adjuster 13, almost 30°, enables extensive variation of the total throttle cross section of the damper. This makes optimal adaptation of the damper to prevailing road and vehicle conditions possible.

8. Because of the high adjusting speed, transient changes in state can be compensated for.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A hydraulic shock absorber having an automatically adjustable damper force, which comprises a cylinder (2), a damper piston (7) that is axially movable in said cylinder, said damper piston divides said cylinder interior into two chambers (9, 10) and has a controllable flow across section, a piston rod (6) connected to said damper piston within said cylinder and protruding to the outside through one end of said cylinder, a control slide (14) including at least two solid sections and at least two oppositely disposed sections having a plurality of radial openings, a fixed hollow cylinder slide surrounding said control slide (14) and provided with a plurality of radial openings (54) relative to said control slide (14), an electromagnetic rotary adjuster (13) within said piston for controlling said control slide for monitoring at least two flow cross sections, said electromagnetic rotary adjuster (13) is a permanently excited single-winding rotary adjuster having a maximum adjusting range of 30°, and a magnetic safety resetting.

2. A shock absorber as defined by claim 1, in which said electromagnetic rotary adjuster (13) includes a permanent-magnetic rotor (31), which given bipolar supply has two active torque directions.

3. A shock absorber as defined by claim 2, in which said permanent-magnetic rotor (31) is formed of a hollow-cylinder and has smooth, polished inner and outer jacket faces (47, 47').

4. A shock absorber as defined by claim 3, in which said electromagnetic rotary adjuster (13) includes a stator (30) that receives said rotor (31), said stator comprises individual plates and a single coil (40), said single coil is divided into two halves (41, 42), connected in a series circuit.

5. A shock absorber as defined by claim 4, in which said hollow-cylindercial permanent-magnetic rotor (31) of said electromagnetic rotary adjuster (13) receives a rotary adjuster shaft (26), which at its end has a rotary slide (48) of said control slide (14), and that said rotary adjuster shaft (26) is provided with a stop (27/28) for determining its rotational angle.

6. A shock absorber as defined by claim 5, in which said control slide (14) is inserted into a piston housing recess (12), and that said piston housing recess (12) has a hollow-cylindrical slide (53), into which the rotary slide (48) of said control slide (14) is received.

7. A shock absorber as defined by claim 3, in which said damper piston (7) has a recess (12), surrounded by a piston housing (11), into which recess the electromagnetic rotary adjuster (13) is inserted.

8. A shock absorber as defined by claim 7, in which said hollow-cylindercial permanent-magnetic rotor (31) of said electromagnetic rotary adjuster (13) receives a rotary adjuster shaft (26), which at its end has a rotary slide (48) of said control slide (14), and that said rotary adjuster shaft (26) is provided with a stop (27/28) for determining its rotational angle.

9. A shock absorber as defined by claim 8, in which said control slide (14) is inserted into a piston housing recess (12), and that said piston housing recess (12) has a hollow-cylindrical slide (53), into which the rotary slide (48) of said control slide (14) is received.

10. A shock absorber as defined by claim 3, in which said hollow-cylindercial permanent-magnetic rotor (31) of said electromagnetic rotary adjuster (13) receives a rotary adjuster shaft (26), which at its end has a rotary slide (48) of said control slide (14), and that said rotary adjuster shaft (26) is provided with a stop (27/28) for determining its rotational angle.

11. A shock absorber as defined by claim 10, in which said control slide (14) is inserted into a piston housing recess (12), and that said piston housing recess (12) has a hollow-cylindrical slide (53), into which the rotary slide (48) of said control slide (14) is received.

12. A shock absorber as defined by claim 11, in which shock absorber fluid is permitted to flow through the piston housing recess (12), the stator (30), and includes a gap between the rotary slide (48) and the slide (53) which determines a basic flow through the damper piston.

13. A shock absorber as defined by claim 11, which includes a position sensor (16) on said damper piston (7) for sensing the position of the rotary slide (48) with respect to said hollow cylindrical slide (53) at a given time and said position sensor (16) is inserted into an extension (15) of a piston housing (11).

14. A shock absorber as defined by claim 10, which includes a position sensor (16) on said damper piston (7) for sensing the position of the rotary slide (48) with respect to slide (53) at a given time and said position sensor (16) is inserted into an extension (15) of a piston housing (11).

15. A shock absorber as defined by claim 14, which includes an electronic control unit for self-regulation of the shock absorber, said position sensor (16) is disposed on the damper piston (7) and sends an actual-value signal through the piston rod (6) to said electronic control unit.

16. A shock absorber as defined by claim 2, in which said electromagnetic rotary adjuster (13) includes a stator (30) that receives said rotor (31), said stator comprises individual plates and a single coil (40), said single coil is divided into two halves (41, 42), connected in a series circuit.

17. A shock absorber as defined by claim 16, in which said permanent-magnetic rotor (31) of said electromagnetic rotary adjuster (13) has an outside diameter which is approximately equal to the outside diameter of said piston rod (6).

18. A shock absorber as defined by claim 2, in which said damper piston (7) has a recess (12), surrounded by a piston housing (11), into which recess the electromagnetic rotary adjuster (13) is inserted.

19. A shock absorber as defined by claim 18, in which said permanent-magnetic rotor (31) of said electromagnetic rotary adjuster (13) has an outside diameter which is approximately equal to the outside diameter of said piston rod (6).

20. A shock absorber as defined by claim 2, in which said permanent-magnetic rotor (31) of said electromagnetic rotary adjuster (13) has an outside diameter which is approximately equal to the outside diameter of said piston rod (6).

21. A shock absorber as defined by claim 1, in which said electromagnetic rotary adjuster (13) includes a stator (30) that receives a rotor (31), said stator comprises individual plates and a single coil (40), said single coil is divided into two halves (41, 42), connected in a series circuit.

22. A shock absorber as defined by claim 21, in which said damper piston (7) has a recess (12), surrounded by a piston housing (11), into which recess the electromagnetic rotary adjuster (13) is inserted.

23. A shock absorber as defined by claim 1, in which said damper piston (7) has a recess (12), surrounded by a piston housing (11), into which recess the electromagnetic rotary adjuster (13) is inserted.

* * * * *